US008747199B1

(12) United States Patent
Palmisano et al.

(10) Patent No.: US 8,747,199 B1
(45) Date of Patent: Jun. 10, 2014

(54) SYSTEM AND METHOD OF MEASURING PHYSICAL ACTIVITY TO PROGRESS IN GAME (75) Inventors: Chris Palmisano, Louisville, KY (US); Benjamin Gibson Sawyer, Freeport, ME (US)

(73) Assignee: Humana Inc., Louisville, KY (US)

( * ) Notice: Subject to any disclaimer, the term of this patent is extended or adjusted under 35 U.S.C. 154(b) by 0 days.

(21) Appl. No.: 13/043,110

(22) Filed: Mar. 8, 2011

Related U.S. Application Data (60) Provisional application No. 61/311,912, filed on Mar. 9, 2010.

(51) Int. Cl.
*A63F 9/24* (2006.01)

(52) U.S. Cl.
USPC .......... 463/7; 463/6; 463/9; 463/43; 434/255; 235/105; 482/8

(58) Field of Classification Search
USPC .......................................... 463/1–6, 40–42, 7
See application file for complete search history.

(56) References Cited

U.S. PATENT DOCUMENTS

| 5,001,632 | A | * | 3/1991 | Hall-Tipping | 463/7 |
| 5,524,637 | A | * | 6/1996 | Erickson | 600/592 |
| 5,947,868 | A | * | 9/1999 | Dugan | 482/4 |
| 5,980,384 | A | * | 11/1999 | Barrie | 463/16 |
| 6,033,307 | A | * | 3/2000 | Vancura | 463/20 |
| 6,302,789 | B2 | * | 10/2001 | Harada et al. | 463/7 |
| 7,431,645 | B2 | * | 10/2008 | Han et al. | 463/16 |
| 7,708,627 | B2 | * | 5/2010 | Lind | 463/16 |
| 8,079,903 | B2 | * | 12/2011 | Nicely et al. | 463/20 |
| 2004/0180708 | A1 | * | 9/2004 | Southard et al. | 463/1 |
| 2005/0287502 | A1 | * | 12/2005 | Southard et al. | 434/236 |
| 2006/0025282 | A1 | * | 2/2006 | Redmann | 482/8 |
| 2007/0239479 | A1 | * | 10/2007 | Arrasvuori et al. | 705/2 |
| 2007/0287523 | A1 | * | 12/2007 | Esses et al. | 463/20 |
| 2008/0262786 | A1 | | 10/2008 | Pavlidis | |
| 2009/0117989 | A1 | * | 5/2009 | Arezina et al. | 463/20 |
| 2009/0227358 | A1 | * | 9/2009 | Yoshizawa | 463/21 |
| 2009/0253484 | A1 | * | 10/2009 | Saito | 463/20 |
| 2009/0264172 | A1 | * | 10/2009 | Morimura et al. | 463/7 |
| 2010/0075741 | A1 | * | 3/2010 | Aoki et al. | 463/20 |
| 2011/0118002 | A1 | * | 5/2011 | Aoki | 463/20 |

FOREIGN PATENT DOCUMENTS

| JP | 08103568 | A | * | 4/1996 | A63F 9/22 |
| JP | 11110514 | A | * | 4/1999 | G06M 7/00 |
| JP | 2004264244 | A | * | 9/2004 | G01C 22/00 |

* cited by examiner

*Primary Examiner* — Ronald Laneau
*Assistant Examiner* — Ross Williams
(74) *Attorney, Agent, or Firm* — Standley Law Group LLP (57) ABSTRACT

A computerized system and method for measuring physical activity to advance play in a game. In example embodiments, a cell phone generates a screen display and the game is played through the mobile device. The measurement of physical activity progresses the player through the game by progressing the player through "game days," by permitting the player to travel from a current location to another location on a map of the game, by earning rewards points for the player that may be utilized in game play, etc. A specified number of steps equates with a game day and a complete game is measured in game days. The device tracks physical activity, related game days, and completion of games. During a game day, a player advances in the game as well as encounters challenges and obstacles and may be prompted to make other decisions related to the game play.

20 Claims, 7 Drawing Sheets

SYSTEM AND METHOD OF MEASURING PHYSICAL ACTIVITY TO PROGRESS IN GAME

CROSS REFERENCES TO RELATED APPLICATIONS

This application claims priority to U.S. Provisional Patent Application Ser. No. 61/311,912, filed Mar. 9, 2010, titled SYSTEM AND METHOD OF MEASURING PHYSICAL ACTIVITY TO PROGRESS IN GAME, the content of which is incorporated herein by reference.

FIELD OF THE INVENTION

The present invention relates to gaming systems. In particular, exemplary embodiments relate to a system and method of playing a game on a mobile device where the mobile device measures the physical activity of the player and the observed measurement causes the player to progress through the game.

BACKGROUND AND SUMMARY OF THE INVENTION

Maintaining a healthy lifestyle is important for numerous reasons. First, it can have a huge impact on the quality of a person's life. People who are healthy tend to be happier, and more successful in day-to-day endeavors. Furthermore, as the life span of individuals continues to grow, leading a healthy life increases the odds that the later years of life are enjoyable. Second, maintaining a healthy lifestyle can have an impact on the costs of health care. Individuals who are healthy tend to require less medication, less treatment for ailments, less hospital time, etc.

Unfortunately, there are many existing factors that encourage individuals to lead an unhealthy lifestyle. The increasing convenience of many technologies has caused people to be more sedentary than ever before. Teens and adults in particular are spending more and more time in front of televisions and computers and less and less time partaking in healthy activities such as physical exercise. In particular, many individuals are choosing to spend their time playing video games that do not require much physical movement rather than getting involved in sports or games that require the exertion of significant physical energy. While some video gaming systems have created fitness programs, these fitness programs do not typically incorporate a game. Furthermore, because most video gaming systems are connected to a television or incorporated into a computer (desktop or laptop) the amount of physical activity that can be performed while playing the game is limited.

There is a need in the art for a game that incorporates walking, jogging, running, or other physical activity. In an example embodiment, the game is played on a mobile device (such as a cell phone) where the mobile device comprises an accelerometer based pedometer that records the player's step count. The mobile device may record a step count according to the player's selection of a location for holding the device such as pocket, bag, hand, arm, or belt. The accuracy of step count may vary depending on where the player holds the device while walking. In some embodiments, a screen of the mobile device is used to display a virtual avatar. The virtual avatar may be selected by the game player. Within the game, there may be a map with multiple nodes where the avatar moves from one node on the map to another according to the step count of the player. In an example embodiment, the avatar's speed of travel is determined by the player's step count. Thus, in order to move the avatar through the game on the mobile device, a player takes numerous steps that in turn contribute to improving the player's health.

In an example embodiment, a game of the present invention implements a pedometer to measure the number of steps taken by the game's player and utilizes the measurement to progress the player through the game. There are a variety of ways the physical activity measurement can be utilized to progress a player through the game. For example, a game could comprise a map and the number of steps measured by the pedometer could determine how quickly the player moves from one point on the map to another. In another embodiment, a player takes a certain number of steps to progress from a current position in the game to another position (such as from one node on a map to the next). Some embodiments may utilize a measurement of the player's physical activity to award points to the player in the game. In an example embodiment, a game comprises a certain number of segments and a mobile device being utilized to play the game records a predefined level of physical activity by the player in order to move from one segment to the next. For example, a game may comprise seven "game years" or 2,555 "game days" where each "game day" expires upon the player having taken 500 steps. In this embodiment, completion of the game requires the player to take 1.27 million steps. In embodiments comprising an avatar, a measurement of physical activity may be utilized to buy accessories for the avatar that can be utilized by the avatar in game play.

In some embodiments of the game, an objective is to manage a growing gold rush business and build the biggest fortune possible. In these embodiments, the game comprises a map of a gold rush state, such as the State of California, where the map has various towns, cities, and claims. By leaving miners at various claims, gold can be mined and then taken to banks for safe-keeping. During game play, the player may encounter special characters and items that assist the player in accomplishing game objectives. A game may additionally comprise virtual villains that interfere with or attempt to impede a player's game progress. In example embodiments where mining for gold is a game objective, a player utilized a cellular phone comprising a pedometer that measures the number of steps taken by the player. In example embodiments, the screen of the cell phone is utilized to generate a screen display and the game is thus played through the mobile device. The measurement of physical activity is utilized to progress the player through the game by progressing the player through "game days," by permitting the player to travel from a current location to another location on a map of the game, by earning rewards points for the player that may be utilized in game play, etc. There are many ways the physical activity of a player can be utilized to progress a player through a game.

BRIEF DESCRIPTION OF THE DRAWINGS

A better understanding of the disclosed embodiments will be obtained from a reading of the following detailed description and the accompanying drawings wherein identical reference characters refer to identical parts and in which.

DETAILED DESCRIPTION

Figure 1:
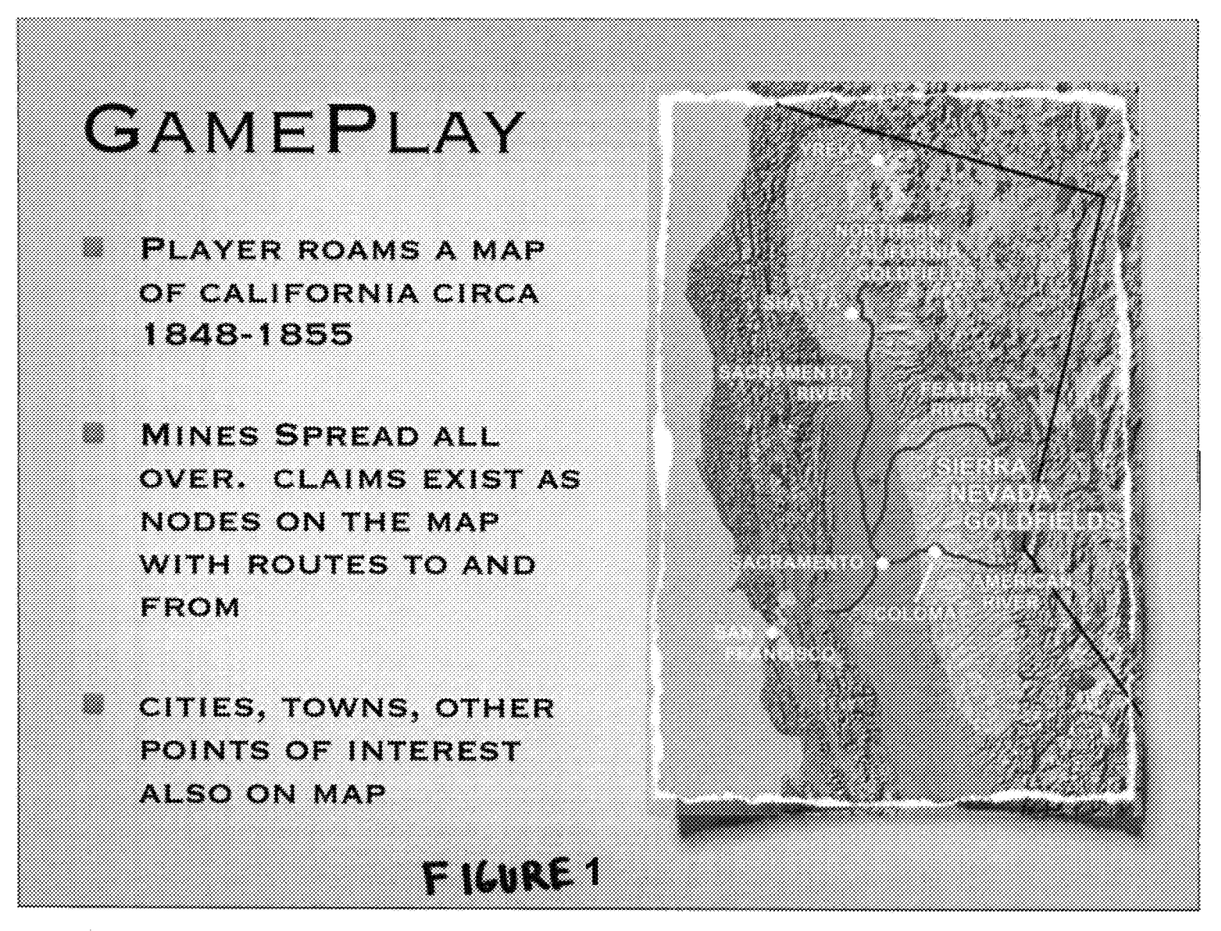
FIG. 1 shows an exemplary embodiment of a map that may be utilized in an exemplary embodiment of the game of the present invention.

Referring to FIG. 1, in one exemplary embodiment, a game of the present invention measures and records the physical activity of a player to progress the player through a game comprising a map where the map has multiple locations that are accessed based on the physical activity exerted by the player where the physical activity is measured by a pedometer. In an example embodiment, the device that measures the physical activity of the player is part of a mobile device (such as a cell phone) that can be utilized to generate a game display. In one exemplary embodiment, the map is of the State of California and has a vintage appearance. Other exemplary embodiments do not necessarily comprise a map but may comprise a game board, virtual world, virtual obstacle course, etc. that is utilized in game play.

In embodiments comprising a map of the State of California, the object of the game may be to manage a growing gold rush business and build the biggest fortune possible ("California gold rush embodiments"). In example embodiments, a player meets the objectives of the game by performing physical activity and entering commands into a mobile device that can be used to generate a game display. In some embodiments, the device that records physical activity measurements is the same device that generates a game display and receives commands from a player. Receiving a command from a player could be receiving a command as to the player's next move in the game, to save the game progress, to perform a certain action with an avatar, to utilize earned wealth to make a virtual purchase of an accessory that could be utilized in game play, etc.

Referring again to FIG. 1, in certain exemplary embodiments, a game display comprises an image of a map of California circa 1848-1855. The map may comprise numerous gold mine locations that are identified across the map. Claims may exist as nodes on the map where directions to and from the claim may be found. Directions may incorporate a required amount of physical activity that the player exerts to arrive at the claim from his or her current location on the map. A map may further comprise cities, towns, and other points of interest. In some embodiments, a player is penalized for failing to perform physical activity based on his or her location on the game's map. For example, a portion of the map of California could include a desert. If the player accesses that portion of the map, he or she may have to perform a certain amount of physical activity in a predefined amount of time in order to make it out of the desert and continue playing the game.

In one exemplary embodiment comprising a map of California where the object of the game is to manage a growing gold rush business and build the biggest fortune possible, a player starts with a predetermined amount of virtual money, a number of miners, and a means of transportation. The player may have, for example, $500 virtual dollars, five miners, and a mule. In some embodiments, each player of the game is started at the same spot on a virtual map while in other embodiments the location on a map where game play starts is variable. In some embodiments, a player may be able to inform the game how much physical activity he or she wishes to exert and that determines his or her starting position on a map. Once the game has started, physical activity measurements progress the player through the game. In some embodiments physical activity measurements can be manually entered by a player through a data entry means of a device generating a game display, but preferably the physical activity is measured by an electronic device such as a pedometer that either transfers the physical activity data to a portable device generating a game display or that is a part of the device. In California gold rush embodiments, players may be able to locate possible cites on a map that they wish to purchase and survey or buy a claim out. By exerting physical activity, players may be able to take miners and equipment to purchased mines and leave them in place to earn gold. In example embodiments, a player does not know how much gold is at various mines until he or she has left miners there to mine. A player may be able to purchase multiple mines and leave miners at each one. If a player runs out of miners, he or she may be able to acquire more through physical activity or through gold they have acquired through mining. A player may utilize a mule to transport equipment and supplies to miners as well as to transport gold from mines to cities on the map that have banks so that the gold may be safely kept. The ability to complete these actions is contingent on the player performing physical activity. In some embodiments, the object of the game is not to manage a growing gold rush business and build the biggest fortune possible. There are many game objectives that could be implemented by a game of the present invention.

In California gold rush embodiments, a player may be vulnerable to various threats such as being burgled by bandits and claim jumpers that steal mines and/or mule trains. Protection against threats may be purchased as the game progresses. For example, a player may be able to purchase a guard with earned wealth. In another embodiment, the more physical activity that is recorded, the less vulnerable the player is to game threats. Players may be able to sell active mines for money to prospectors to finance further exploration. In some embodiments, the game involves multiple players. In these embodiments, a player may sell his property to another player or may attempt to acquire another player's property. A game may comprise "special characters" that are randomly located throughout the game where the characters give the player special tips, maps, or other upgrades that assist the player in playing the game when they are located.

A map of a game of the present invention may comprise distinct locations such as towns and cities. Towns and cities may have predefined amenities. In a California gold rush embodiment for example, cities may have banks and clerks to certify claims while towns may have saloons and stables and be the home to experienced miners. It may be an object of the game to exert physical activity to travel from one location on a map to another in a predefined period of time.

In California gold rush embodiments comprising towns, each town may comprise all or some of the following options: a saloon; mining camps; a supply store; stables; etc. These amenities may each permit a player to perform different activities while playing the game such as going to a saloon to find gunslingers to use as guards and pick up rumors, go to a mining camp to find experienced miners to hire or purchase out other claims, go to a supply store to purchase food and mining supplies or to sell gold, go to a stable to purchase mules or horses to transport food, supplies, gold, etc. In an example embodiment, some of these activities are carried out within the game by a player's avatar. Physical activity by the player may be required before some of the activities may be performed. In other embodiments comprising towns, the towns may comprise amenities that are in line with the theme and objective of the game.

In California gold rush embodiments comprising cities, each city may comprise all or some of the following options: banks (to store gold for better prices); a county clerk (to certify ownership or sell claims for funds); docks (available in San Francisco to hire new miners vs. experienced miners). Again, these amenities may permit a player to perform different activities while playing the game.

In embodiments comprising cities, some cities may have special features not possessed by the others. In these embodiments, players reach those cities in order to take advantage of the special features as shown in Table 1.

TABLE 1

Features of Cities

| City | Description |
| --- | --- |
| San Francisco | City with ability to get new miner labor; no stables |
| Stockton | No bank; largest pool of miners |
| Sacramento | Clerk |
| Carson City | Has larger pool of gunslingers |
| Chico | Special Stables |
| Shasta | Northernmost Outpost |

This requirement causes the player to exert physical activity that is recorded by the mobile device on which the game is being played. In some embodiments, the special features of cities may be altered throughout game play in order to encourage additional physical activity.

In a California gold rush embodiment, an object of the game may be to mine as much gold as possible. In these embodiments, a player may be required to go to an empty claim with at least one miner, stake the claim, and leave at least one miner there to mine then depart the claim to access another claim, visit a city or town, etc. For example, each 500 player-steps recorded may trigger a day in the life of the game. Each game day may trigger a random number of ounces per day found by each miner at a claim. In some embodiments, physical activity is additionally required to travel between locations on a map of the game. Thus, physical activity can be required for multiple purposes by a game of the present invention. Claims may be designed to have set amounts of gold and density.

Table 2 shows an exemplary embodiment of parameters of how gold may be mined in a game of the present invention where gold mining is a game objective.

TABLE 2

Finding Gold

First, go to an empty claim with at least one miner and stake the claim and leave at least one miner in its spot, then leave claim alone.
For every 500 overall steps you take (~1/4 mile for the average person), you will trigger a day in the life of the game.

TABLE 2-continued

Finding Gold

Each game day triggers a random number of ounces per day found by each miner at the claim. Claims can have 1-12 miners per claim. Those ounces appear on your map at the claim spot.
Claims are designed to have set amounts of gold and density creating a rating of 1-X in terms of productivity. Claims that are more productive are more likely to be jumped.

When mining gold is an objective of a game of the present invention, a game may utilize certain parameters for maintaining gold that has been found. For example, gold may be stored at claims until it is pack muled out, claims with an excessive amount of gold on hand may be subject to being jumped repeatedly, claims with too little gold per miner may be deserted, and once gold is on mules, the player may be required to guide the mules back to a town and/or city to sell or deposit the gold in a bank.

Additional gold maintenance parameters may be implemented in a game of the present invention when mining gold is a game objective. For example, once gold is in the bank, it may be part of a player's score and cannot be taken away. Additional, claims may diminish over time and resources reallocated. In games of the present invention where mining for gold is not an objective, different game parameters may be implemented.

When mining gold is an objective of a game of the present invention, and when a player has successfully mined gold at a claim, the claim may be susceptible to being jumped. Table 3 shows an exemplary embodiment of claim jumping parameters that may be utilized by a game of the present invention. In example embodiments, the probability of a claim being jumped depends on the amount of gold being held at the claim and the number of guards a player has positioned at the claim. Sometimes a claim may be jumped by another player (the "jumping player") and if certain actions have not been taken to protect the claim, the jumping player may obtain control over the claim.

TABLE 3

Claim Jumping Rules

Claims are potentially jumped when gold on hand > XXX
If a claim is jumped and is not certified with the clerk, it may become property of someone else if not restaked in XXXXX steps.
If a claim is jumped and you posted guards, you will lose 0-50% of the guards but no gold.
Once guards are <50% of your total miners, you will lose 0-X miners as well.
Once guards <2, your claim is completely jumpable.
If a claim is jumped and is certified with the clerk, you only lose gold but not the claim itself.

When mining gold is an objective of a game of the present invention, the game may comprise different types of mines. As shown in Table 4 some types of mines that may be utilized include:

TABLE 4

Types of Mines

| Type | Description |
| --- | --- |
| Placer | Shallow mines near surface. Easy to mine, close to towns, but less productive because of competition. Takes panning trays, horses, or mules. |

TABLE 4-continued

Types of Mines

| Type | Description |
| --- | --- |
| Shallow | "Pay Dirt" near surface. Further away from towns, more productive in general. Takes shovels, horses, or mules. |
| Deep | "Pay Dirt" over 20 feet beneath surface. More productive in general but takes pick axes. Must be pack muled. |

It may be impossible for a player to determine what type of mine is at issue until he has positioned miners there to begin work.

A game of the present invention may comprise means of transportation that assist a player in navigating through the game. These means of transportation are used by a player's avatar. An exemplary embodiment may comprise mules and horses as means of transportation. Mules and horses may be purchased at stables in towns and be brought to a claim by the player. Once at a claim, they may be loaded up and transported back to town or cities. In game play, horses move slower than mules but carry more gold (because mules have more endurance). For example, horses may move 1000 steps a day while mules move 2000 steps a day.

In certain exemplary embodiments, a player of a game earns points based on his or her physical activity that is recorded. For example, every step taken by a player and recorded may result in the player being awarded a point. In other embodiments, a player may be awarded a point for having taken a specified number of steps. There are many ways a player may be rewarded points based on his or her physical activity. Once a player has earned points in a game by participating in physical activity, the player may be able to utilize those points within the game. For example, points may equate to virtual currency that may be utilized to make purchases within the game. In some embodiments, there are various levels to be reached by earning points where reaching a level results in the player being rewarded somehow in game play. Table 5 shows an exemplary embodiment of how physical activity can by utilized to earn points in an exemplary embodiment of the game of the present invention and an exemplary embodiment of how those points may be used.

TABLE 5

Hoof Points

Every step creates a hoof point in the game.
You can bank hoof points with extended walks without playing the game.
Some parts of the day or week give you extra hoof points.
Once a horse or mule is at a mine and loaded with gold, you can send it through the map by expended hoof points.
Hoof points mean you don't have to walk 1:1 for every part of the game.
Hoof points create another incentive to walk without the burden of playing in full interactive mode.

A game of the present invention may comprise special features such as special characters and rumors. Special historical figures may exist on the map at certain times. When the player finds them, he or she may receive special upgrades or information that may be used to increase point yields. The historical figures may include location of a mythical pickaxe, plans for a stamp mill, or special mules that can be purchase. Rumors may relate to areas of the map that have upgraded finds, bandits, or miners that are willing to sell for a discount. There are numerous types of special features other than special characters and rumors that may be implemented in embodiments of a game of the present invention.

A game of the present invention may further comprise special items. Special items may be virtual possessions that enhance a player's ability to play a game of the present invention. In an embodiment where mining gold is an objective of the game, special items may include: golden pick (mythical item that triples production for the mine using it); stamp mill (special apparatus that can increase production); mammoth jack (big mule that can carry more gold); TNT (dynamite to upgrade deep mine productivity); and scout (to watch for bandits).

An objective of a game of the present invention is to encourage physical activity by requiring physical activity to be exerted to progress in game play. A level of activity is measured (e.g., using a pedometer) and transferred to a player's profile or account at a computerized device. The player's activity level is used to play the game and cause the player to progress in the game. In embodiments comprising a map where an objective is to travel between various locations on the map, a player may be required to walk the distance between map nodes. This distance may be scaled in numerous ways. Furthermore, the game may require that resources be moved, some nodes may not reveal contents until the player arrives at the node or an adjacent node, and an outlaw may be active in a node for a specified number of game days.

A game of the present invention may incorporate virtual villains that interfere with or attempt to impede a player's ability to progress in a game of the present invention. In embodiments where gold mining is an objective, virtual villains may comprise outlaws and claim jumpers. Outlaws may exist on "road" nodes that are neither mines nor places. They may remain on a road for a specified period of time such as one week of game days (3500 steps). Claim jumpers may exist randomly at mines that have too much gold or at productive mines with few guards, miners, or certified claims. Outlaws and claim jumpers may be thwarted by guards.

In an exemplary embodiment where mining for gold is an objective, the game may comprise mule-trains. In a particular exemplary embodiment, mule-trains may be used by a player to move gold and supplies throughout the game. Moving a mule-train may or may not require the exertion of physical activity by the player. A player may have a traveling party that is left behind by a player at spots on a map. Mule-trains may be alone or with guards but in both cases may be moved by the player with hoof points. Mules with gold may be moved by hoof points.

A game of the present invention may comprise special characters. In one embodiment, special characters are able to provide a player's avatar with special skills that may be utilized in game play. Table 6 shows an example of special characters that may be utilized in a game where mining for gold is an objective and an example of how the special characters may assist a player in game play.

TABLE 6

Special Characters

| Character | Description |
| --- | --- |
| Scout | When present with player, helps player avoid outlaws. |
| Doctor | When present with player, can help heal sick miners. |
| Gunfighter | When present with player, can fight off outlaws and remove them from map. |
| Surveyor | When present with player, can help identify gold left in mine. |
| Engineer | Allows play to setup stamping mill. |

Figure 2:
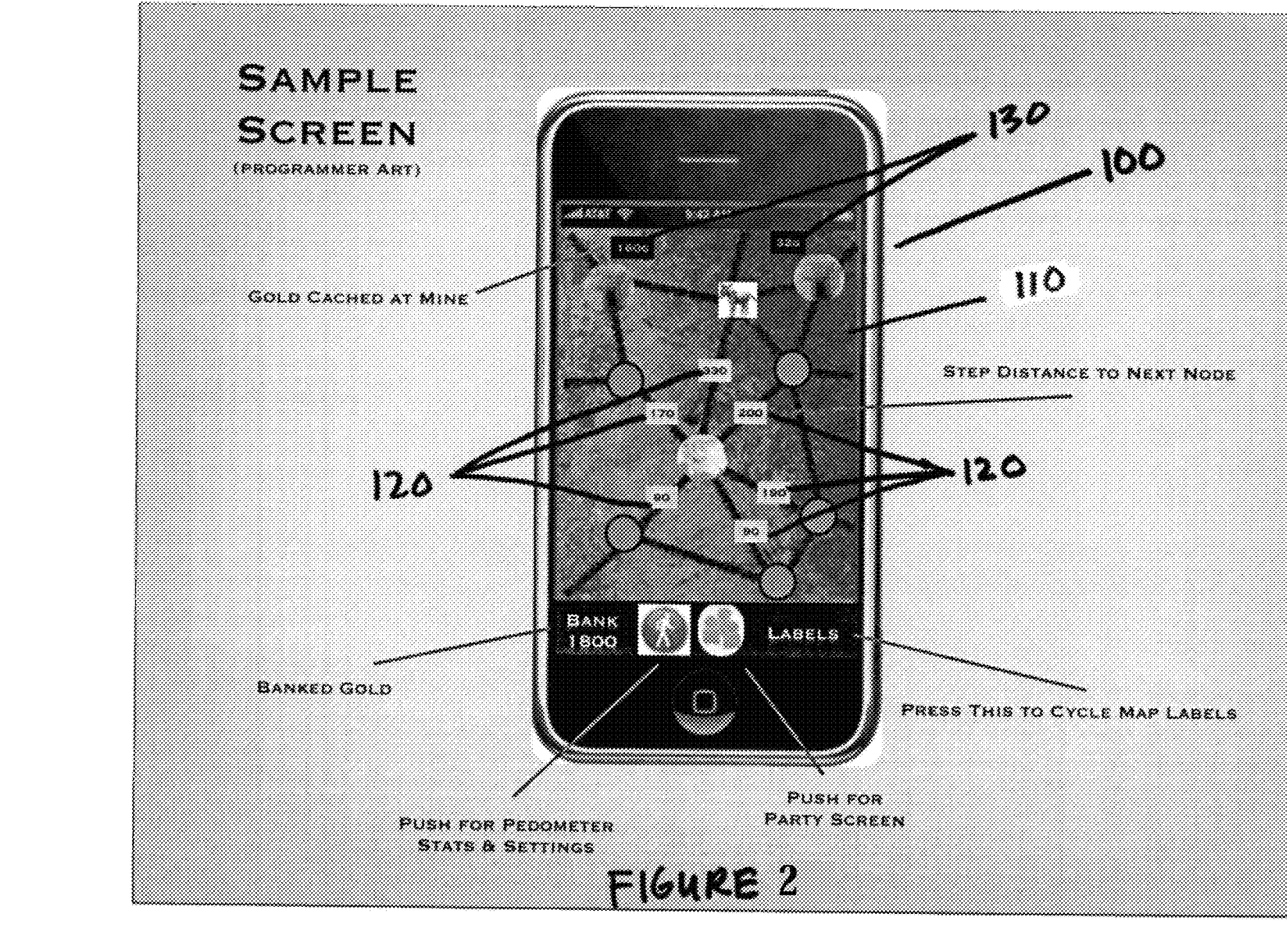
FIG. 2 shows an exemplary embodiment of a mobile device being utilized to play an exemplary embodiment of the game of the present invention.

Referring to FIG. 2, in an example embodiment, a player exerts physical activity that is measured by a mobile or other computerized device that is utilized to play a game where the measurement permits the player to progress through the game. An example of a mobile device that may be utilized is a cell phone. FIG. 2 shows an exemplary embodiment of a mobile device 100 that may be utilized to perform the present invention where said mobile device comprises a screen 110. As shown in FIG. 2 the screen is utilized to generate a game display where the game display comprises a map and various art. A map of a game of the present invention may display the distance between locations on the map where the distances displayed correlate to a certain amount of physical activity that must be exerted and measured in order to travel from one location to the other. FIG. 2 shows an exemplary embodiment of how distances 120 may be incorporated into a map of a game of the present invention. In embodiments where gold mining is an objective of game play, a game display may comprise gold cached displays indicating how much gold has been mined and is being held at a certain location on the map. FIG. 2 shows an exemplary embodiment of how a screen display may comprise gold cached displays 130.

Figure 3:
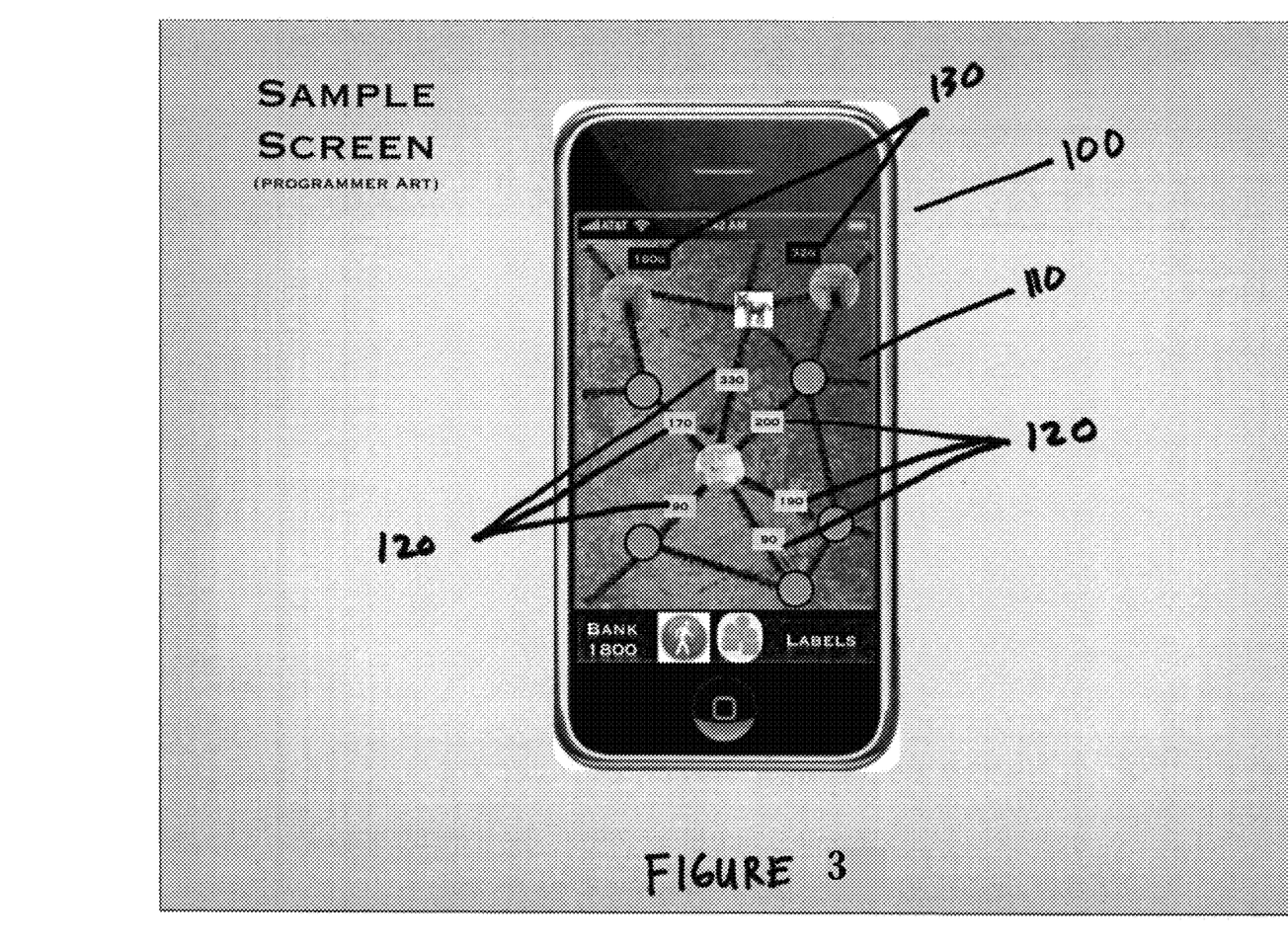
FIG. 3 shows an exemplary embodiment of a mobile device being utilized to play an exemplary embodiment of the game of the present invention.

FIG. 3 shows the exemplary embodiment of FIG. 2 where descriptive information has been removed.

Figure 4:
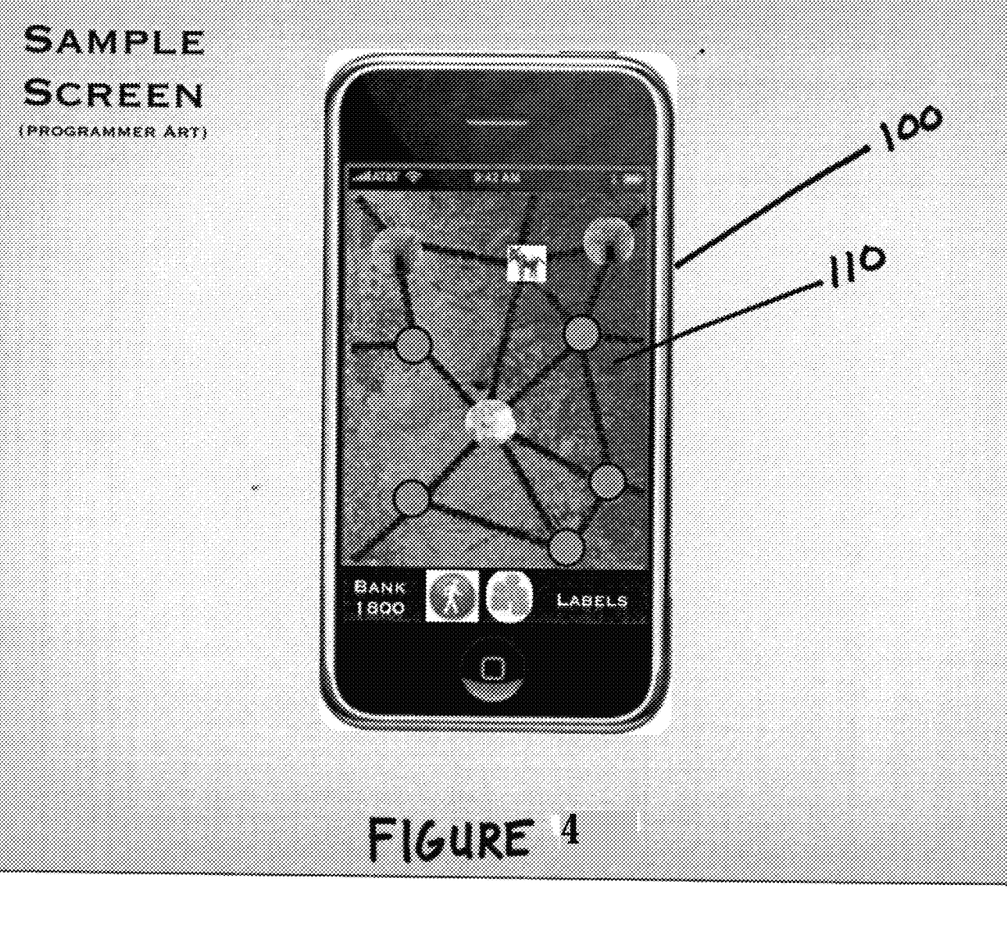
FIG. 4 shows an exemplary embodiment of a mobile device being utilized to play an exemplary embodiment of the game of the present invention.

FIG. 4 shows the exemplary embodiment of FIGS. 2 and 3 where the displayed distances and gold cached values have been removed from the game display. In example embodiments, displayed distances and gold cached values can be removed from the game display upon the game's receiving a request from the player to remove these features. The removal may be temporary until the player instructs the game to reinstate the display of distances and gold cached values.

Figure 5:
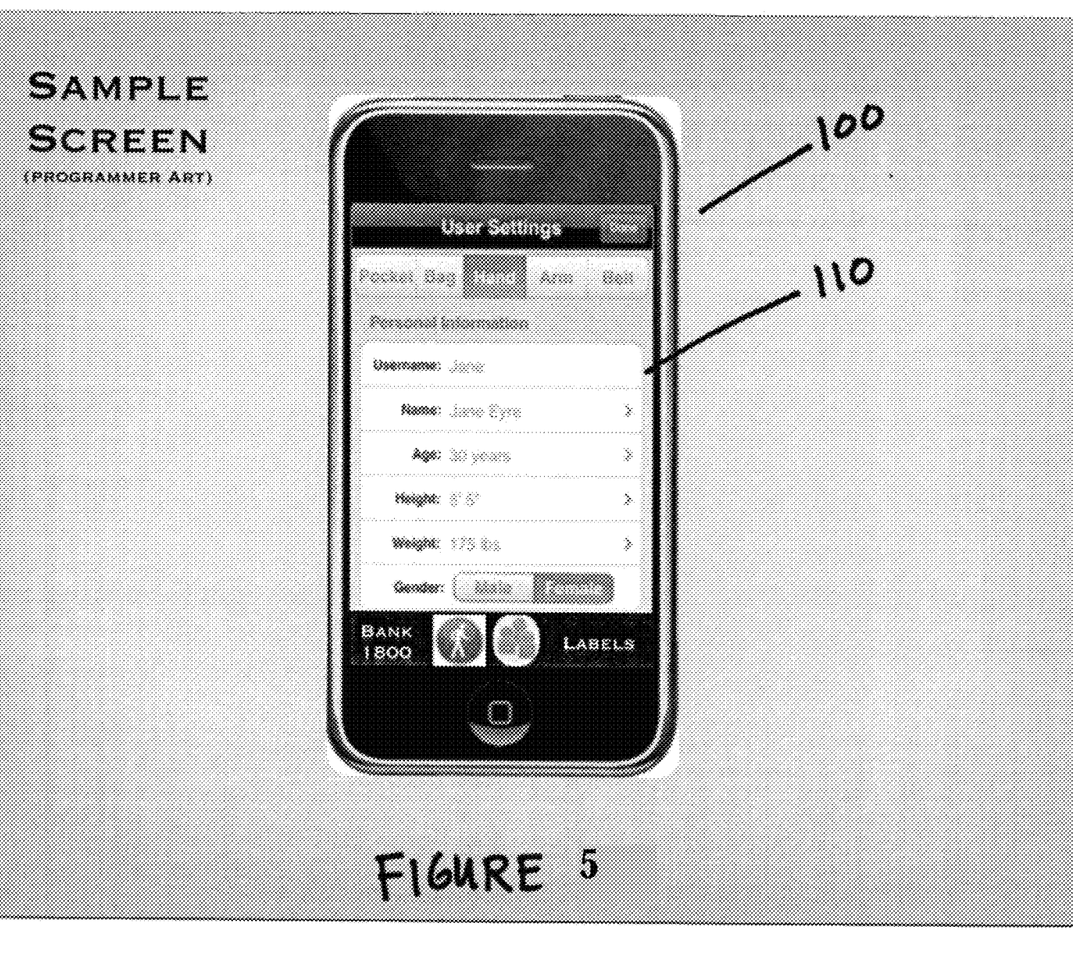
FIG. 5 shows an exemplary embodiment of a mobile device being utilized to adjust player settings for an exemplary embodiment of the game of the present invention.
Figure 6:
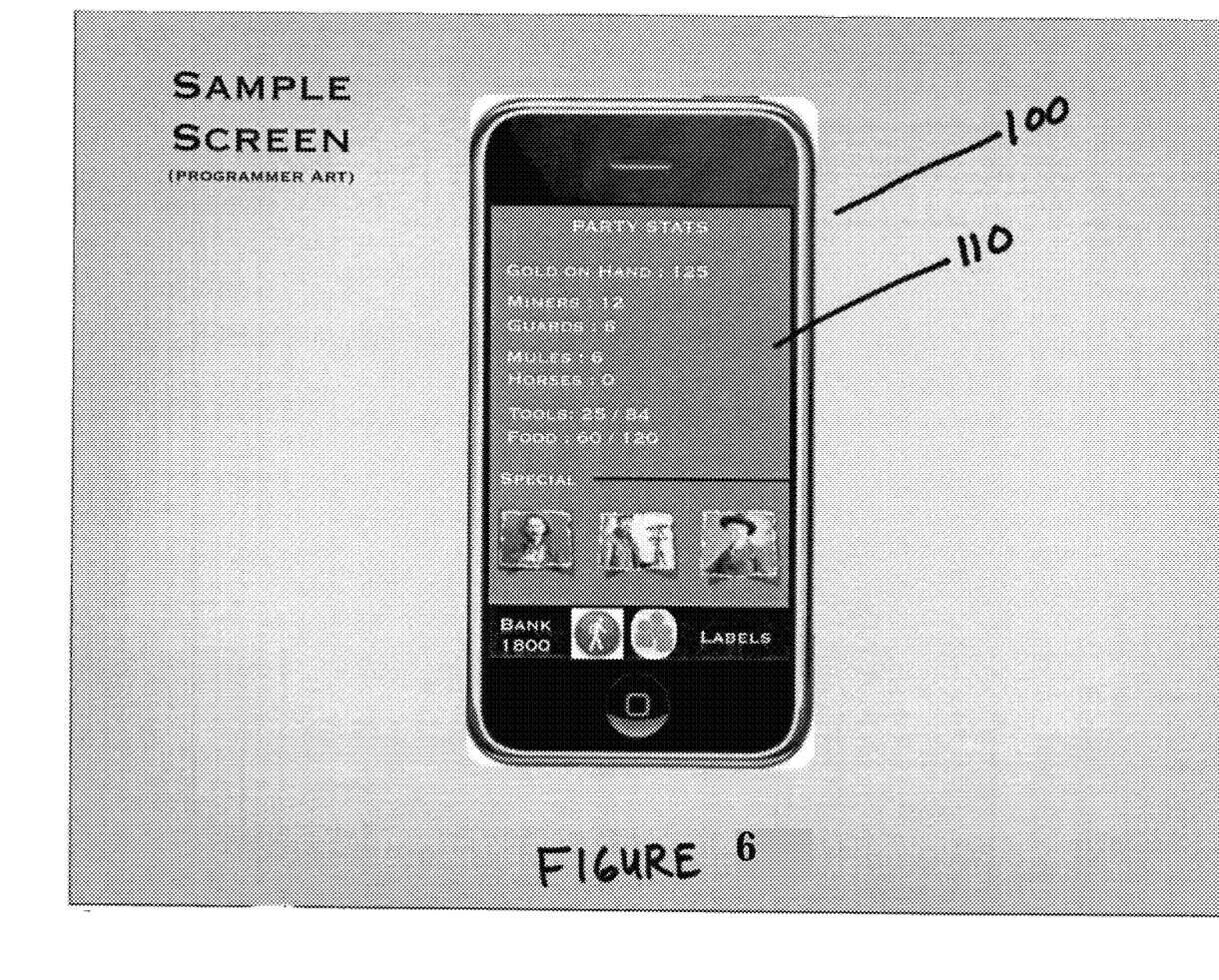
FIG. 6 shows an exemplary embodiment of a mobile device being utilized to display player statistics for an exemplary embodiment of the game of the present invention.

Referring to FIG. 5, a game of the present invention may require a player to provide it with personal or identifying information to create a profile or account. The personal or identifying information required may comprise user name, name, age, height, weight, gender, etc. Personal data may further comprise a location where a player holds a mobile device being utilized to measure physical activity. A player may provide a game with personal information by utilizing a data entry means of a mobile device utilized in game play. Personal data may be displayed on a screen of a mobile device once it has been entered by the player. FIG. 6 shows an exemplary embodiment of an exemplary mobile device displaying exemplary personal data.

Figure 7:
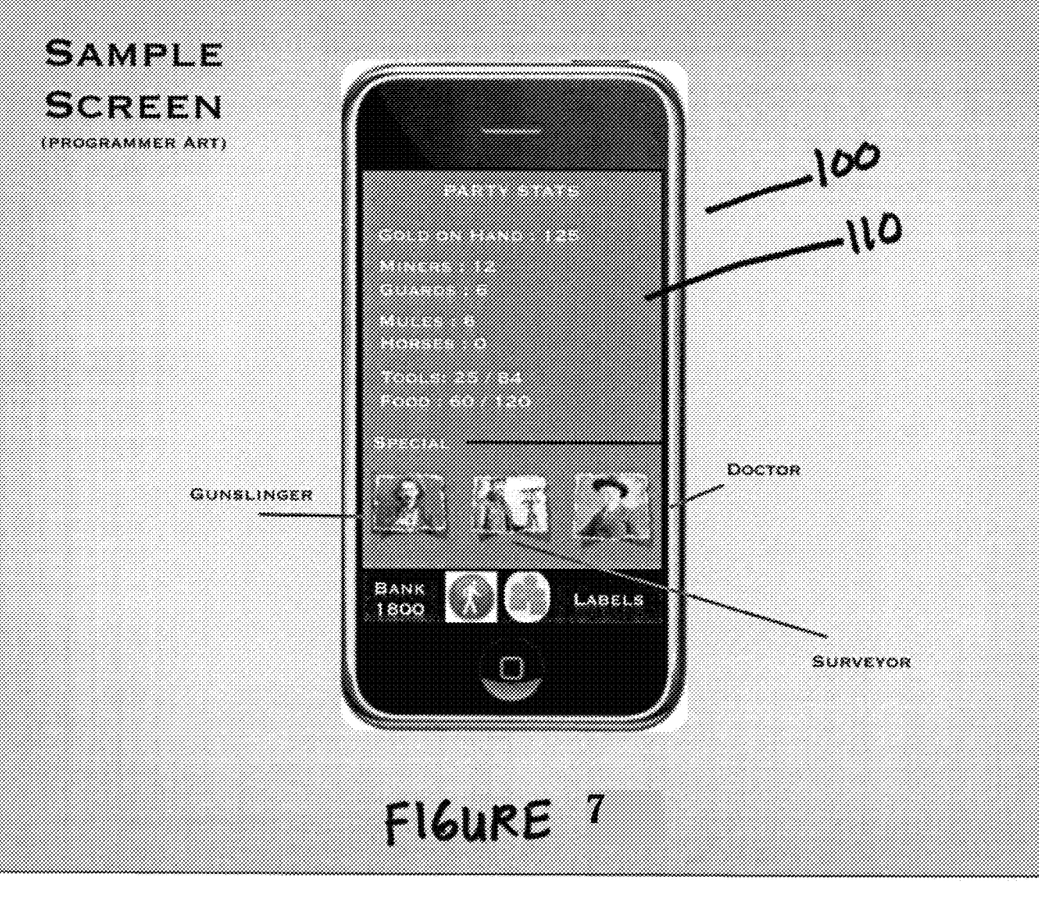
FIG. 7 shows an exemplary embodiment of a mobile device being utilized to display player statistics for an exemplary embodiment of the game of the present invention where exemplary special characters are shown highlighted.

Referring to FIG. 7, in some embodiments, a game may generate a player statistics screen for display where the statistics screen shows the player's progress in the game. FIG. 7 shows an exemplary embodiment of a statistics screen that may be implemented by a game of the present invention.

FIG. 8 shows the exemplary embodiment of FIG. 7 where the special characters that have been accessed by the player during game play (Gunslinger, Surveyor, and Doctor) are highlighted.

Referring to Table 7, by requiring physical activity for a player to progress in game play, a player may obtain certain health benefits such as weight loss. Table 7 shows how an exemplary embodiment of the game of the present invention could cause a player to lose approximately 18 pounds. In an example embodiment, the player's activity level (e.g., 500 steps) is converted into game units or points used in advancement or progression of the game play. In an example embodiment, the game units may be game time (e.g., day) units. In other embodiments, the game units may be game distance units. A player's avatar advances in the game play according to the game units earned in connection with the physical activity.

TABLE 7

| Rough Walking Math | |
|---|---|
| 500 Steps = | 1 Game Day |
| Game Time = | 7 Years (1848-1855) |
| 7 * 365 * 500 = | 1.27 Million Steps |
| 1.27 Million Steps/2000 = (Average steps in a mile) | 638 Miles if game is played to completion |
| 638 Miles/365 = | 1.75 Miles if played every day |

If 100 calories are burned for walking one mile, during the total game time, 63,800 calories are burned which is equivalent to 18 points. This amount does not include hoof points earned beyond game time played.

Some exemplary embodiments may comprise more than one map. Different maps may have different game objectives while in some embodiments different maps correlate to the same objectives. For example, a first map could be a map of the State of California where an objective is to mine for gold and build the largest possible fortune and a second map could be a heavily wooded state where the object is to build a fortune through the acquisition of timber. Some games may not have the accumulation of wealth as an objective. Some maps that may be implemented in a California gold rush embodiment include maps for the Yukon Gold Rush, Georgia Gold Rush, South Dakota Gold Rush, etc.

A computerized pedometer game system and method is described in reference to the appended figures. The description with reference to figures is made to exemplify the disclosed computerized system and method and is not intended to limit the system and method to the representations in the figures. From the foregoing description, it can be understood that there are various ways to construct a pedometer based game, advance play, and award points in relation to counted steps while still falling within the scope of the present invention. Various play parameters related to settings, characters, and game play may be modified and fall within the scope of the present invention. As such, while certain embodiments of the present invention are described in detail above, the scope of the invention is not to be considered limited by such disclosure, and modifications are possible without departing from the spirit of the invention as evidenced by the following claims.

What is claimed is:

1. A computerized method for playing a game comprising a computerized device executing programming instructions for:
    (a) receiving at said computerized device player identifying data for a player of said game;
    (b) storing at said computerized device a time unit value for measuring completion of said game;
    (c) storing at said computerized device an activity level threshold;
    (d) initializing by said computerized device a point total;
    (e) initializing by said computerized device a time unit counter;
    (f) receiving at said computerized device an activity level value for said player related to a physical activity performed by said player;
    (g) adding by said computerized device to said point total a point value corresponding to said activity level;
    (h) comparing by said computerized device said point total to said activity level threshold;
    (i) if said point total is equal to or exceeds said activity level threshold:
        (1) incrementing by said computerized device said time unit counter;

(2) modifying by said computerized device at least one element of play in said game;

(j) in response to a command received from said player:
(1) advancing by said computerized device play in said game; and
(2) decreasing by said computerized device said point total by a point value corresponding to said command; and (k) repeating steps (f)-(j) until said computerized device determines said time unit counter is equal to said time unit value for measuring completion of said game.

2. The computerized method of claim 1 wherein said time unit is a game day.

3. The computerized method of claim 1 wherein said activity level value is steps taken by said player.

4. The computerized method of claim 1 wherein said command is a request to move an avatar for said player between locations in said game.

5. The computerized method of claim 1 wherein said activity level value is further used to award bonus points to said player.

6. The computerized method of claim 2 wherein completion of a game day triggers a modification to a number of points associated with a game play command.

7. The computerized method of claim 1 further comprising presenting by said computerized device during game play a plurality of player challenges for a specified number of time units.

8. A computerized system for playing a game comprising:
(1) a physical activity device for measuring physical activity of a player; and
(2) a game play device for receiving physical activity data for said player and presenting to said player game displays, said game play device programmed with instructions to:
(a) store at said computerized device a time unit value for measuring completion of said game;
(b) store at said computerized device an activity level threshold;
(c) initialize a point total;
(d) initialize a time unit counter;
(e) receive at said game play device from said physical activity device an activity level value for said player related to a physical activity performed by said player;
(f) add to said point total a point value corresponding to said activity level;
(g) compare said point total to said activity level threshold;
(h) if said point total is equal to or exceeds said activity level threshold:
(1) increment said time unit counter; and
(2) modify at least one element of play in said game;
(i) in response to a command received from said player:
(1) advance play in said game; and
(2) decrease said point total by a point value corresponding to said command; and
(j) repeat steps (e)-(i) until said time unit counter is equal to said time unit value for measuring completion of said game.

9. The computerized system of claim 8 wherein said time unit is a game day.

10. The computerized system of claim 8 wherein said activity level value is steps taken by said player.

11. The computerized system of claim 8 wherein said command is a request to move an avatar for said player between locations in said game.

12. The computerized system of claim 8 wherein said activity level value is further used to award bonus points to said player.

13. The computerized system of claim 9 wherein completion of a game day triggers a modification to a number of points associated with a game play command.

14. The computerized system of claim 8 wherein said game play device further comprises instructions to present player challenges for a specified number of time units.

15. A computerized method for playing a game comprising a computerized device executing programming instructions for:
(a) receiving at said computerized device player identifying data for a player of said game;
(b) storing at said computerized device a time unit value for measuring completion of said game;
(c) storing at said computerized device an activity level threshold;
(d) initializing by said computerized device a point total;
(e) initializing by said computerized device a time unit counter;
(f) receiving at said computerized device an activity level value for said player related to a physical activity performed by said player;
(g) adding by said computerized device to said point total a point value corresponding to said activity level;
(h) comparing by said computerized device said point total to said activity level threshold;
(i) if said activity value is below said activity level threshold, advancing by said computerized device game play within a time unit in response to receiving a command from said player;
(j) if said activity level value is equal to or exceeds said activity level threshold:
(i) modifying by said computerized device at least one element of play in said game;
(ii) advancing by said computerized device game play according to said modified element of play in response to receiving a command from said player; and
(iii) incrementing by said computerized device said time unit counter; and
(k) repeating steps (f)-(k) until said computerized device determines said time unit counter is equal to said time unit value for measuring completion of said game.

16. The computerized method of claim 15 wherein said time unit is a game day.

17. The computerized method of claim 15 wherein said activity level value is steps taken by said player.

18. The computerized method of claim 15 wherein said command is a request to move an avatar for said player between locations in said game.

19. The computerized method of claim 15 wherein said activity level value is further used to award bonus points to said player.

20. The computerized method of claim 15 further comprising initiating by said computerized device a new game for said player when said time unit counter is equal to said time unit value.

* * * * *